No. 722,807. PATENTED MAR. 17, 1903.
C. H. BURCKETT.
MALT SUGAR CONFECTION AND PROCESS OF MAKING SAME.
APPLICATION FILED DEC. 21, 1901.
NO MODEL.
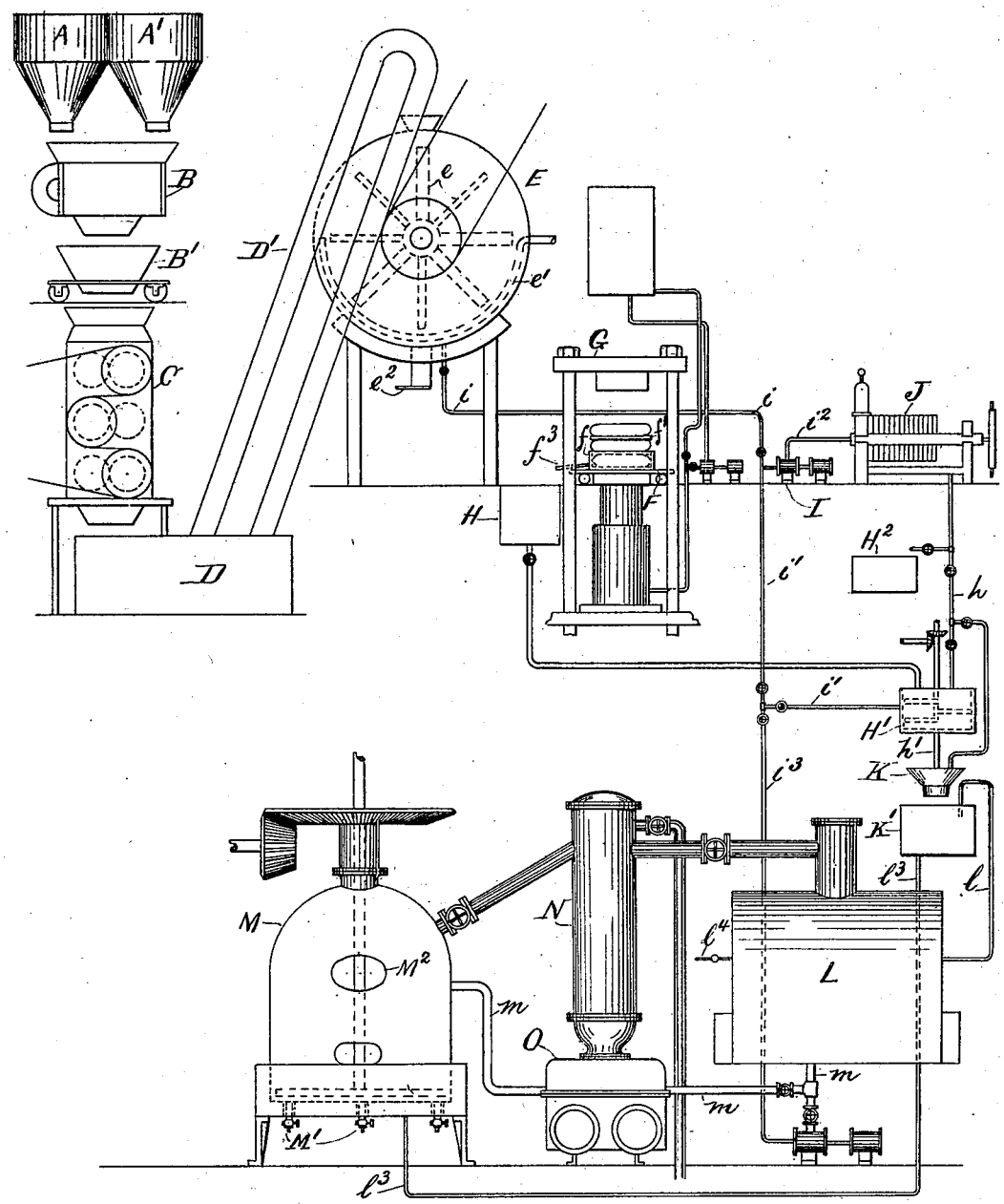
Witnesses
Inofolin Ross.
William P. Franel.
Inventor
Charles Henry Burckett
By his Attorney
A. A. de Bomeville

UNITED STATES PATENT OFFICE.

CHARLES HENRY BURCKETT, OF GLENRIDGE, NEW JERSEY.

MALT-SUGAR CONFECTION AND PROCESS OF MAKING SAME.

SPECIFICATION forming part of Letters Patent No. 722,807, dated March 17, 1903.

Application filed December 21, 1901. Serial No. 86,768. (No specimens.)

*To all whom it may concern:*

Be it known that I, CHARLES HENRY BURCKETT, a citizen of the United States, and a resident of Glenridge, in the county of Essex and State of New Jersey, have invented certain new and useful Improvements in Malt-Sugar Confections and Processes of Making the Same, of which the following is a specification.

This invention relates to malt-sugar confections, and comprises the product as well as the preparation of a combined wheat and malt extract with sufficient malt to convert all the starch present into maltose, dextrine, malto-dextrines, &c., and then adding thereto an additional quantity of malt extract to insure the presence of an excess of malt-diastase, to the end that the finished product may have diastatic power sufficient to act on a notable quantity of starch.

The confection may be combined with various flavoring agents, and this application will comprise its combination with cocoa.

To produce a malt-sugar-confection cocoa, malt sugar is prepared from wheat, twelve hundred pounds; water, four thousand three hundred and sixty pounds; lime, nine pounds; malt, nine hundred pounds, to which is added cocoa or chocolate liquor, eighteen hundred pounds, and a portion of diastase syrup, which is made from malt, four hundred and fifty pounds; lime, three pounds; water, seven hundred and fifty pounds, and a second portion of diastase syrup is added, which is prepared from malt, three hundred pounds; lime, two pounds; water, six hundred pounds, and to the total mixture are added albumen, ten pounds; carbonate of soda, seven to eight pounds.

Referring to the drawing, which shows an elevation of apparatus by means of which this process can be carried out and the product formed, I will enumerate the successive steps and the proportionate quantities in which the ingredients are combined.

I take twelve hundred pounds of wheat from a hopper A, clean it, preferably in a fanning-mill B, and then generally crush it in a roller-mill C, after which it is deposited into a tank D. A conveyer D' takes it to a mash-tank E, containing revolving blades $e$ and steam-coils $e'$, in which the grain is boiled with about four thousand two hundred pounds of water for four hours, adding about two pounds of lime to neutralize the acids generated during the boiling. The contents of the tank are allowed to cool to 170° Fahrenheit. I next take nine hundred pounds of malt from a hopper A', clean it, preferably in a fanning-mill B, and give it a bath of a suitable alkali, consisting, preferably, of about seven pounds of lime and twenty gallons of water, in a movable hopper-tank B' to neutralize the acids in the hulls of the malt, after which the said malt is passed between rollers in the mill C to crush the grain. The malt mixture falls into the tank D, from which it is taken by the conveyer D' to the mash-tank E, and the whole mass is thoroughly agitated at 170° Fahrenheit for about three hours, by virtue of which the diastase in the malt converts all of the starch of the wheat of the mixture into malt-sugar and dextrine. The mass is allowed to run from the mash-tank E through the slide-opening $e^2$ into blankets, generally of hydraulic-press cloth or the like, supported on zinc-lined pans $f$, carried on trucks F. About one hundred and twenty-five pounds of the mass are introduced into each of the blankets, a sufficient number of which are placed in horizontal layers in the said pans. The blankets are separated by wooden-slat racks $f'$ to facilitate the subsequent expression of the juices. The pans, with their contents, are then, by means of their trucks, run under hydraulic presses G and subjected to pressure, and the juices issue from a spout $f^3$ into a tank H, from which they are led to a steam-jacketed kettle H'. To secure all of the syrup from the grain, the mass remaining in the blankets is removed and mixed with a requisite quantity of water at 170° Fahrenheit, after which it is subjected to the same operation of pressing in the blankets. The second liquor is added to the first, and the mixture is kept warm in the kettle H'.

Instead of using the hydraulic presses, as just described, I may pump the mass from the mash-tank E, by means of the piping $i$ $i^2$ and pump I, through a filter-press J after diluting it with a sufficient quantity of water, thereby separating the syrup from the mass. The cakes left in the filter-press are washed in hot water, and the solution obtained is led through the piping $h$ to the steam-jacketed kettle H', in which it is kept warm. The syrup is led from the kettle H' through piping $h'$ into a strainer K, from which it is deposited into a tank K', from which it is directly drawn into the vacuum-pan M through the piping $l^3$. The vacuum is broken and about eighteen hundred pounds of chocolate liquor, cocoa-nibs, or cocoa-bean are added, and the mass is boiled for about five hours to break the starch-cells of the said chocolate liquor, cocoa-nibs, or cocoa-bean, the syrup acting as a menstruum for the disintegration of the said cells. The presence of the menstruum is necessary for the disintegration on account of the density of the chocolate liquor, cocoa-nibs, or cocoa-bean and the presence of a large proportion of cocoa-butter, which would retard the breaking up of the cells. The mass is allowed to cool at 170° Fahrenheit, when malt-diastase syrup, prepared from four hundred and fifty pounds of malt, three pounds of lime, and seven hundred and fifty pounds of water, is introduced into to the vacuum-pan and the mass stirred for three to four hours at 170° Fahrenheit without vacuum, or until the starch of the chocolate liquor is converted into malt-sugar, dextrine, &c. While this transformation is taking place, the diastase acts on the starchy covering of the butter globules, breaking them up or dissolving them, so that the butter is freed, and in this condition it becomes thoroughly incorporated or assimilated in the mass, thus making the butter much more ready for absorption by the human system than it would have been in its globular state. Then the mass is boiled down at 200° Fahrenheit under a vacuum to the consistency of a heavy syrup. I then add diastase syrup prepared from three hundred pounds of malt, two pounds of lime, and six hundred pounds of water, after which the vacuum is put on and the mass evaporated at 170° Fahrenheit and until reduced to the consistency of molasses candy. The vacuum is then broken and ten pounds of albumen are added to counteract its deliquescing tendency. The mass is again stirred at 170° Fahrenheit and neutralized with carbonate of soda, after which it is put into pans, cooled, and then placed into the heating-closets, from which it is taken as required, kneaded, and cut in cakes to make a solidified confection, which I term "malt-sugar-confection cocoa."

I will now particularly describe the process by which diastase syrup is prepared, and, referring to the first portion of diastase syrup contained in my confection, it is prepared by taking four hundred and fifty pounds of malt from hopper A, which is then given a bath of alkali, consisting of three pounds of lime and ten gallons of water, to neutralize the acids in the hulls in the movable hopper-tank B, after which the mass is crushed between rollers in the mill C and then deposited in the tank D. The conveyer D' deposits it into the mash-tank E, where it is mixed with seven hundred and forty pounds of water, maintained at a temperature of 170° Fahrenheit, and stirred for two or three hours. The mass issues at the outlet $e^2$ and is placed into blankets carried on the trucks F and pressed in a hydraulic press G to separate the syrup.

I may omit the use of the hydraulic press and add a greater quantity of water to the malt in the mash-tank and then pump the mass, by means of the pump I and piping $i$ $i^2$, through the filter-press J to separate the syrup, which is led to the kettle H'. Hot water is then forced through the filter-press, and the liquor thus obtained is also led into the kettle H'. The solution is then strained through a strainer K and runs into the tank K', from which it is drawn into the evaporator L through the piping $l$, where it is evaporated under a vacuum for five to six hours to the consistency of a thick molasses, obtaining a malt extract containing diastase or a diastase syrup, the temperature being maintained at 170° Fahrenheit. The diastase syrup is led from the evaporator through the piping $m$ into the vacuum-pan M.

Theoretically a sufficient quantity of malt might be included in the first general division of this process in the preparation of the malt-sugar to obtain a surplus of diastase; but practically this is not feasible, because the active properties of the diastase cannot be maintained when heated to over 170° Fahrenheit, while, as above noted, the malt-syrup in the vacuum-pan before adding the diastase syrup is heated to 200° Fahrenheit in order to save time and to secure a better final result. It will be noted that the heating agent employed in the water-jacket of the evaporating-pan is hot water and not steam, so as not to overheat the contents of the vacuum-pan, because, as already stated, the active property of the malt-diastase is destroyed when heated above 170° Fahrenheit.

The presence of the malt-sugar in the confection imparts the property of deliquescing—that is to say, moisture is liable to be taken up from the atmosphere to transform it into a soft sticky mass, and the albumen is added to bind the ingredients, which largely overcomes this tendency. To still further prevent the deliquescing, each small piece of confection is wrapped in wax-paper, and then they are packed in paraffined-paper sealed boxes, the joints of the paper being joined with melted paraffin, obtaining thereby an air and moisture proof box.

A modification of my invention may consist of the following, viz: When the mixture of malt and wheat is ready for the hydraulic press—that is to say, when it has been thoroughly digested in the mash-tank, the starch having been converted into malt-sugar, dextrine, malto-dextrine, &c.—then instead of pressing it with hydraulic presses I treat the mass to centrifugal action, and thereby separate the syrup, which of course will be somewhat cloudy, while the separation with the hydraulic presses is slow, which tends to clarify the syrup. To rectify the effect of the centrifugal action, I mix prepared sawdust or paper-pulp with the syrup and pump this mixture through filter-presses. This sawdust or paper-pulp will hold any matter that would clog the pores of the filter-cloth used in the filter-presses. This method will clarify the syrup very thoroughly. The refuse remaining after the centrifugal action is mixed with water at 170° Fahrenheit after the first wringing and then wrung out again, the second liquor being mixed with the first and finished, as indicated in the steps when hydraulic presses are used. The sawdust is prepared by mixing it with a strong solution of sal-soda or sodium bicarbonate to dissolve all the resinous matter. It is then thoroughly washed with fresh water, and there is obtained an almost pure cellulose.

Having described my invention, I claim—

1. A composition containing a malted-wheat extract, malt extract, and cocoa, in all of which the starch has been converted into maltose, dextrine or malto-dextrine.

2. A composition containing a malted-wheat extract, malt extract, malt-diastase, starchless cocoa, and a binding agent.

3. A solidified confection consisting of, a malted-wheat extract, malt extract, cocoa, malt-diastase, albumen and carbonate of soda.

4. The herein-described process of manufacturing a confection, consisting in crushing wheat, boiling the same with water, adding lime, cooling the mass to 170° Fahrenheit, taking malt, cleaning it, and giving it a bath of alkali, then crushing it, mixing the malt and wheat mixtures and heating, filtering the mass, adding cocoa-bean to the filtrate and boiling the mixture to break the starch-cells of the said cocoa-bean, allowing the mass to cool to 170° Fahrenheit then adding diastase syrup, stirring and heating the mixture until the starch of the cocoa-bean is converted into malt-sugar, malt-dextrine, &c., then boiling the mass down at 200° Fahrenheit to the consistency of heavy molasses, then adding a second portion of diastase syrup and heating and evaporating at 170° Fahrenheit to the consistency of heavy molasses candy, next adding albumen and stirring at 170° Fahrenheit and neutralizing with carbonate of soda, and then cooling.

5. The herein-described process of making malt-sugar-confection cocoa, consisting in mixing malt-sugar syrup and cocoa-beans, stirring and boiling the mixture, to break the starch-cells of the cocoa-beans, allowing the mass to cool, adding diastase syrup, stirring and heating the mixture, until the starch of the cocoa-bean is converted into malt-sugar, malt-dextrine, &c., and the butter-globules are dissolved or broken up and thoroughly incorporated into the mass, boiling the mass down to the consistency of heavy molasses, adding a second portion of diastase syrup, heating and evaporating to the consistency of molasses, stirring and adding a binding agent, and then neutralizing with carbonate of soda.

Signed at Jersey City, in the county of Hudson and State of New Jersey, this 20th day of December, A. D. 1901.

CHARLES HENRY BURCKETT. [L. S.]

Witnesses:
THEO. RURODE,
GEORGE A. WARDELL.